United States Patent
Philipps-Liebich et al.

(10) Patent No.: US 10,851,526 B2
(45) Date of Patent: Dec. 1, 2020

(54) SANITARY FITTING HAVING A ROSETTE

(71) Applicant: Grohe AG, Hemer (DE)

(72) Inventors: Hartwig Philipps-Liebich, Menden (DE); Thomas Loi, Luedenscheid (DE); Thomas Vorel, Arnsberg (DE)

(73) Assignee: Grohe AG, Hemer (DE)

( * ) Notice: Subject to any disclaimer, the term of this patent is extended or adjusted under 35 U.S.C. 154(b) by 625 days.

(21) Appl. No.: 15/700,578

(22) Filed: Sep. 11, 2017

(65) Prior Publication Data

US 2017/0370078 A1 Dec. 28, 2017

Related U.S. Application Data

(63) Continuation of application No. PCT/EP2016/000411, filed on Mar. 7, 2016.

(30) Foreign Application Priority Data

Mar. 9, 2015 (DE) .......................... 10 2015 002 896

(51) Int. Cl.
*E03C 1/042* (2006.01)
*F16B 5/10* (2006.01)

(52) U.S. Cl.
CPC ................ *E03C 1/042* (2013.01); *F16B 5/10* (2013.01); *E03C 2201/50* (2013.01); *Y10T 403/7007* (2015.01)

(58) Field of Classification Search
CPC .... E03C 1/021; E03C 1/0452; E03C 2201/50; E03C 1/042; F16B 5/0092; F16B 5/10; F16B 7/20; F16B 21/04; Y10T 403/7007

USPC ........................................................ 403/349
See application file for complete search history.

(56) References Cited

U.S. PATENT DOCUMENTS

| | | | | |
|---|---|---|---|---|
| 5,644,441 | A * | 7/1997 | Hirasaki | G02B 7/022 359/827 |
| 7,226,321 | B2 * | 6/2007 | Uhari | G01D 11/24 439/752 |
| 8,261,766 | B1 | 9/2012 | Huang | |
| 9,062,796 | B2 * | 6/2015 | Horsman | F16K 31/602 |
| 2010/0200077 | A1 | 8/2010 | Chan et al. | |

(Continued)

FOREIGN PATENT DOCUMENTS

DE    102013003823 A1    9/2014

OTHER PUBLICATIONS

International Search Report dated Jun. 14, 2016 (English Translation).

*Primary Examiner* — Josh Skroupa
(74) *Attorney, Agent, or Firm* — Muncy, Geissler, Olds & Lowe, P.C.

(57) ABSTRACT

A sanitary fitting, in particular a flush-mounted sanitary fitting, with a rosette that covers a subassembly of the sanitary fitting and that has a trim part on the visible side and a mounting part that is covered by the trim part and can be clamped to the subassembly with an installation wall interposed. The trim part and the mounting part are joined to one another by a separate bayonet ring element that has at least one locking element which can be moved along the circumference of the rosette in a direction of actuation between a locking position, in which the trim part is installed on the mounting part, and a release position, in which the trim part is detachable from the mounting part.

10 Claims, 9 Drawing Sheets

(56) References Cited

U.S. PATENT DOCUMENTS

2013/0312856 A1 11/2013 Huffington et al.
2014/0197343 A1 7/2014 Horsman et al.

* cited by examiner

SANITARY FITTING HAVING A ROSETTE

This nonprovisional application is a continuation of International Application No. PCT/EP2016/000411, which was filed on Mar. 7, 2016, and which claims priority to German Patent Application No. 10 2015 002 896.0, which was filed in Germany on Mar. 9, 2015, and which are both herein incorporated by reference.

BACKGROUND OF THE INVENTION

Field of the Invention

The invention relates to a rosette for a sanitary fitting.

Description of the Background Art

In a sanitary fitting installed such that it is concealed in a building wall, its flush-mounted subassembly is concealed by a splash-proof rosette system. The rosette system can be designed to be multipart with a trim part on the visible side and a mounting part covered by the trim part. The mounting part of the rosette system can be screwed to the flush-mounted subassembly with the building wall interposed. One such generic rosette system is known from DE 102 19 471 B4. According thereto, the trim part on the visible side of the rosette is provided with radially inward-facing projections on the outer circumference that engage under the mounting plate in opposition to the action of an elastic force.

Simple installation and removal of the multipart rosette system is highly relevant. Furthermore, when installation tools are used it is necessary to ensure that no damage occurs to the trim part or to the adjacent tile or wall surface. Moreover, permanently rattle-free retention of the trim part on the mounting part is important.

From US 2014/0197343 A1, a sanitary fitting of the generic type is known in which the trim part is joined to the mounting part by a bayonet connection. To this end, a locking contour is formed on the trim part that can be brought into a bayonet connection with a corresponding mating contour on the mounting part when the trim part is rotated into its locking position. Essentially the same also applies to the sanitary fitting known from U.S. Pat. No. 8,261,766 B1.

SUMMARY OF THE INVENTION

It is therefore an object of the invention to provide a rosette system for a sanitary fitting, in particular a flush-mounted sanitary fitting, in which an installation/removal of the rosette in a simple manner with a commercially available tool is ensured.

The invention is based on the problem that the trim part and the mounting part are joined by means of a snap-on connection in the above prior art. To produce the snap-on connection, the trim part is first pressed onto the mounting part, building up an elastic force. When the final installation position is reached, the snap projections of the trim part snap into corresponding spaces in the mounting part, releasing the elastic force. In contrast thereto, according to the invention the trim part and the mounting part are not joined by a snap-on connection, but rather by a bayonet connection. In the bayonet connection, a locking element can be moved along the circumference of the rosette in a direction of actuation between a locking position and a release position. In the locking position, the trim part is securely installed on the mounting part. In the release position, the trim part is still detachably pre-positioned on the mounting part, namely already in its final installation position. In this way, an easier installation process than in the prior art is achieved, in which damage of the rosette system or adjacent tile or tub surfaces is avoided.

According to an exemplary embodiment of the invention, the locking element is a bayonet ring element that is separate from the trim part and from the mounting part, and that is located between the trim part and the mounting part such that it is concealed from view. The rotary actuation of the bayonet ring element is thus decoupled in its motion from the trim part and from the mounting part. Accordingly, in the release position defined above, the trim part can easily be placed on the mounting part all the way to its final position. Not until afterward is the trim part fixed in its final position through rotary actuation of the bayonet ring element.

In the bayonet connection, the rotatable bayonet ring element and the wall-mounted mounting part constitute the halves of the connection. To this end, the bayonet ring element can have at least one keyhole-like recess that a bayonet stud formed on the mounting part can pass through. In the release position, the widened head of the bayonet stud can be passed through a portion of the keyhole-shaped bayonet opening having a large cross-section, with clearance for motion, in order to pre-position the trim part in its final position. In the locking position, in contrast, the head of the retaining stud can overlap the edge of a portion of the bayonet opening having a small cross-section, via which the trim part is fixed in its final position.

The rosette system according to the invention can thus be three-part in design, namely with trim and mounting parts that are separate from one another and with the bayonet ring element. In view of a reduction of components, however, the bayonet ring element can form a preassembled unit together with the trim part, wherein the bayonet ring element is rotatably supported with respect to the trim part. The trim part is preferably dish-shaped in design, namely with a circular base area that is closed apart from through-holes for the sanitary fitting and that transitions at the circumference of the circle into a continuous raised edge wall. For rotatable support of the bayonet ring element, the continuous edge wall of the trim part can have radially inward-projecting support webs that can surround a mating contour formed circumferentially on the bayonet ring element with little clearance.

As mentioned above, only the bayonet ring element is rotatable, whereas the trim part and the mounting part are installed in a rotationally fixed manner on the installation wall. For this purpose, the trim part can have an anti-rotation feature by means of which the trim part is placed on the mounting part in a rotationally fixed and precisely positioned manner. For instance, an anti-rotation contour can be formed in the continuous edge wall of the trim part, which can be brought into positive engagement with a corresponding mating contour on the mounting part.

Permanently rattle-free retention of the wall-mounted rosette system is very important. Moreover, it is necessary to ensure reliable and simple rosette installation, even when there are surface irregularities in the installation wall (for example, a tile offset in the depth direction). Against this background, the bayonet opening can be formed in a lead-in bevel of the bayonet ring element, which is inclined with an angle of approach with respect to a plane of rotation of the bayonet ring element. The angle of approach is designed such that in the release position, the head of the bayonet stud formed on the mounting part projects beyond the edge of the bayonet opening by a clear height, which is to say that the head is spaced apart from the edge of the bayonet opening. When the bayonet ring element is moved from the release position to the locking position, the head of the bayonet stud is then brought into contact with the inclined edge region of the bayonet opening, entirely occupying the clear height, and preferably is rotated further into the locking position while building up a preloading force. The preloading force results from an elastic deformation of the lead-in bevel and causes the bayonet ring element, together with the trim part, to be pulled against the mounting part with the preloading force, making it possible to provide a largely rattle-free rosette system. Due to the provision in the release position of the clear height between the head of the bayonet stud and the edge of the bayonet opening, a tolerance compensation can take place that makes it possible to compensate for, e.g., surface irregularities in the installation wall (for example, the above-mentioned tile offset in the depth direction).

As is evident from the preceding description, the bayonet ring element can preferably be located within the trim part such that it is concealed from view. For the purpose of rotary actuation, the bayonet ring element can have a tool engagement feature with which the bayonet ring element can be actuated by rotation between the locking and release positions through manual tool action. To this end, the trim part can have, specifically in its circumferential edge wall, a tool access opening that is aligned radially to the outside with the tool engagement feature on the bayonet ring element.

So that the bayonet ring element together with the trim part is pulled against the wall-mounted mounting part in the locking position with elastic preloading force, it is advantageous for the bayonet ring element to be made of a material that is elastically resilient in comparison with the trim part and the mounting part.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
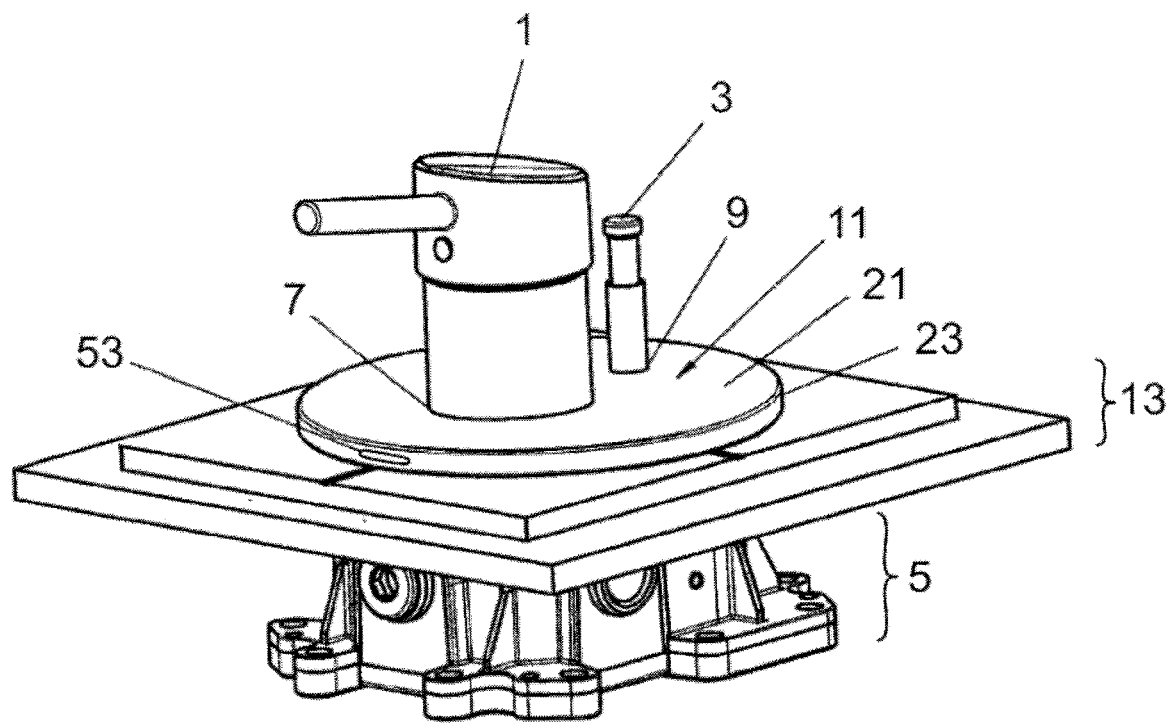
FIGS. 1, 1a and 2 illustrate different views of a flush-mounted sanitary fitting installed on a building wall.
Figure 1A:
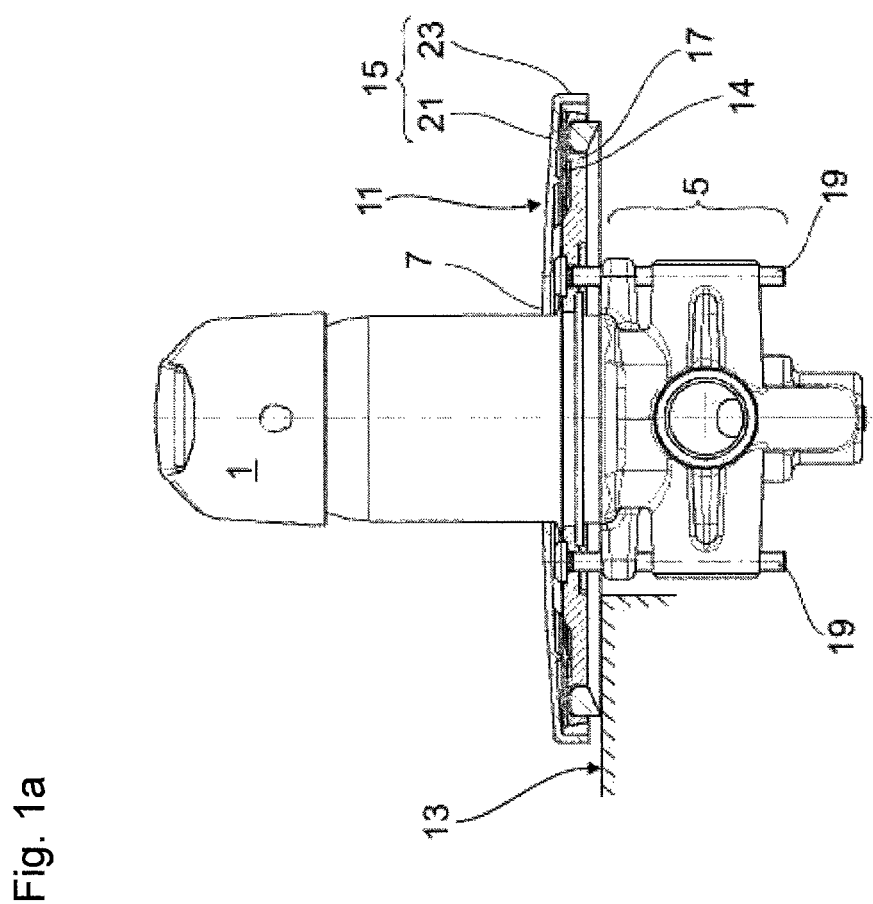
Figure 2:
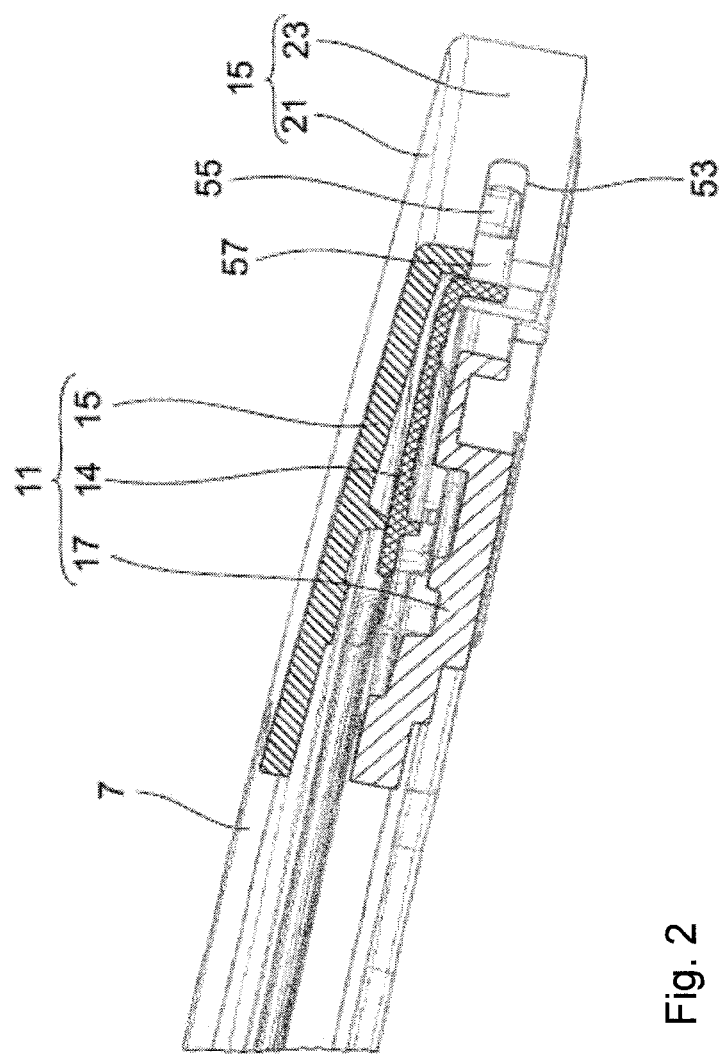

Shown in FIG. 1 is a flush-mounted sanitary fitting for, e.g., a bathtub. The flush-mounted sanitary fitting in FIG. 1 has a first control element 1 for adjusting the temperature and/or volume of mixed water and also has a pushbutton-type control element 3 for changing a water supply. The two control elements 1, 3 are in operative connection in a manner known per se with a flush-mounted subassembly 5 on which the water inlets and outlets are provided. In addition, the two control elements 1, 3 are passed through feed-through holes 7, 9 of a rosette 11 that is in splash-proof contact with an installation wall 13. The rosette 11 in accordance with FIG. 2 is designed overall in three parts with a trim part 15 on the visible side, an interposed bayonet ring element 14, and a mounting part 17. As is indicated in FIG. 1a, the mounting part 17 of the rosette 11 is clamped to the flush-mounted subassembly 5 by mounting screws 19 (which are indicated), with the installation wall 13 interposed. The trim part 15 is made by way of example of a thin-walled sheet metal material or a zinc die casting, namely with a base 21 that is closed over its entire surface with the exception of the two feed-through holes 7, 9. The circular base 21 transitions at the edge into a continuous edge wall 23 that is raised with respect thereto. In the assembled position according to FIG. 1, the dish-shaped trim part 15 overlaps so as to completely conceal from view the bayonet ring element 14 that is made of an elastic soft plastic material and the mounting part 17 that is made of a hard plastic material.

Figure 8:
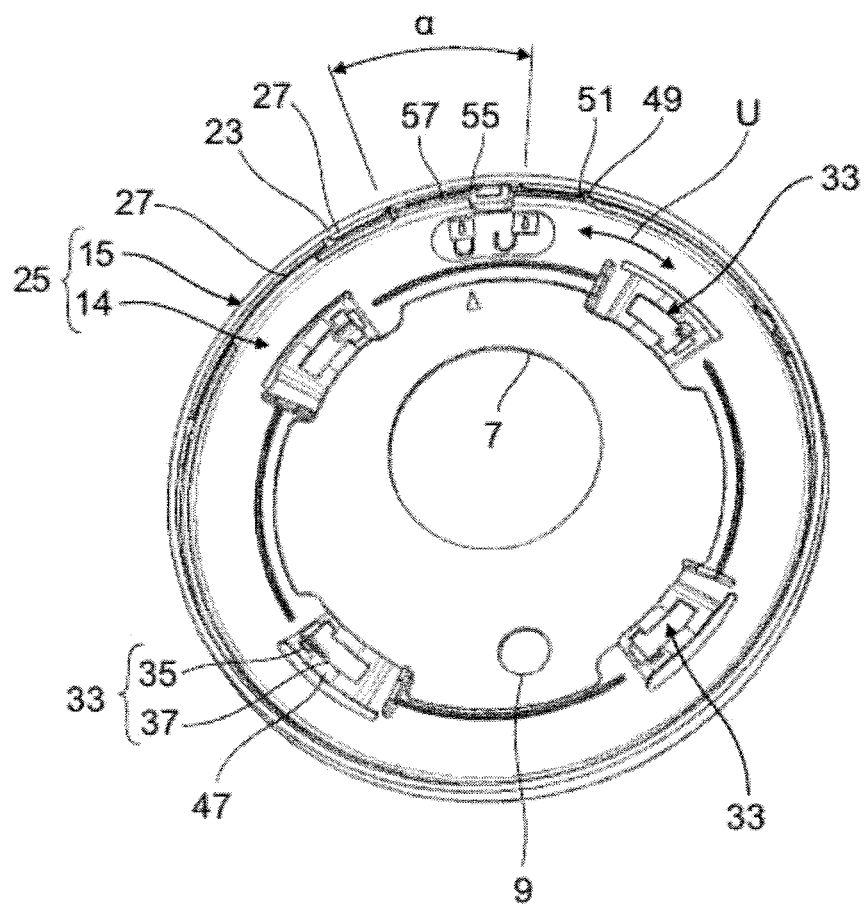
FIG. 8 illustrates a preassembled unit having the trim part and the bayonet ring element.

According to FIG. 8, the trim part 15 and the bayonet ring element 14 can be joined to form a preassembled unit 25 before final installation. In the preassembled unit 25, the bayonet ring element 14 is rotatably supported in a circumferential direction U. For this purpose the trim part 15 has, on its continuous edge wall 23, radially inward-projecting support webs 27 that surround, with little clearance, corresponding mating contours 29 (for example FIG. 4) on the outer circumference of the bayonet ring element 14. In FIG. 8, the bayonet ring element 14 can be moved through an angle of rotation a between a locking position V and a release position E. In the locking position V, the preassembled unit 25 shown in FIG. 8 is securely and non-detachably secured to the mounting part 17. In the release position E, in contrast, the preassembled unit 25 is detachable from the mounting part 17.

Figure 5:
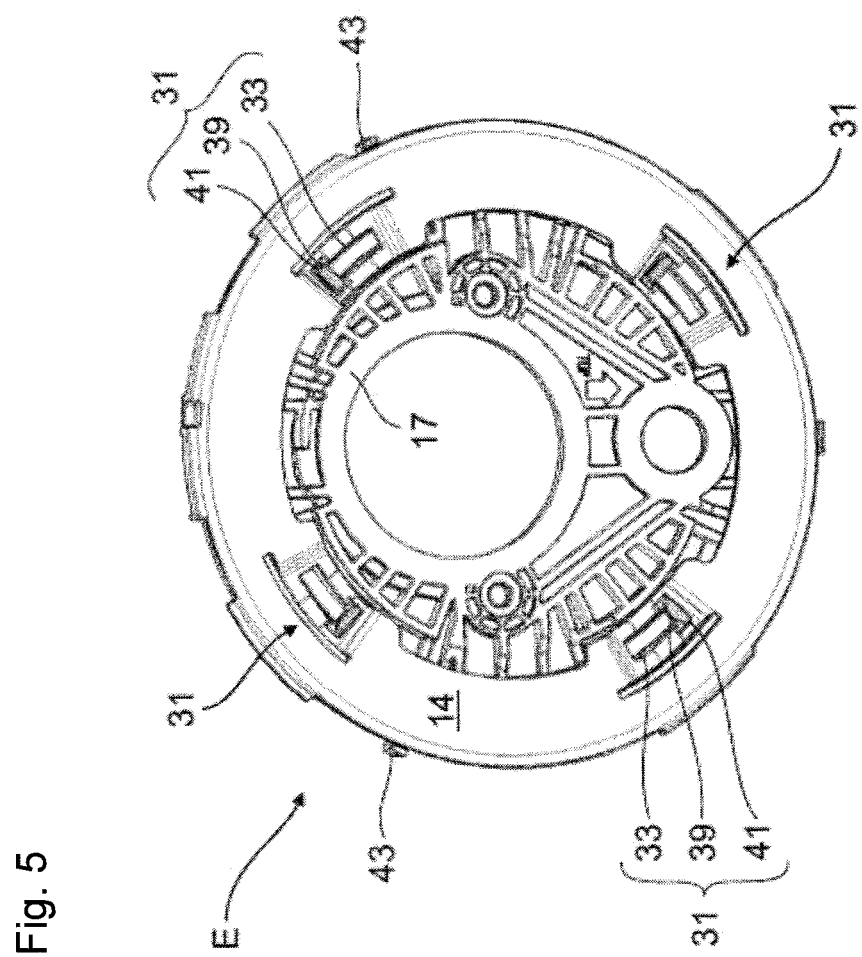
FIGS. 5 and 6 illustrate different views of the rosette system, in which the bayonet ring element is in its release position.
Figure 6:
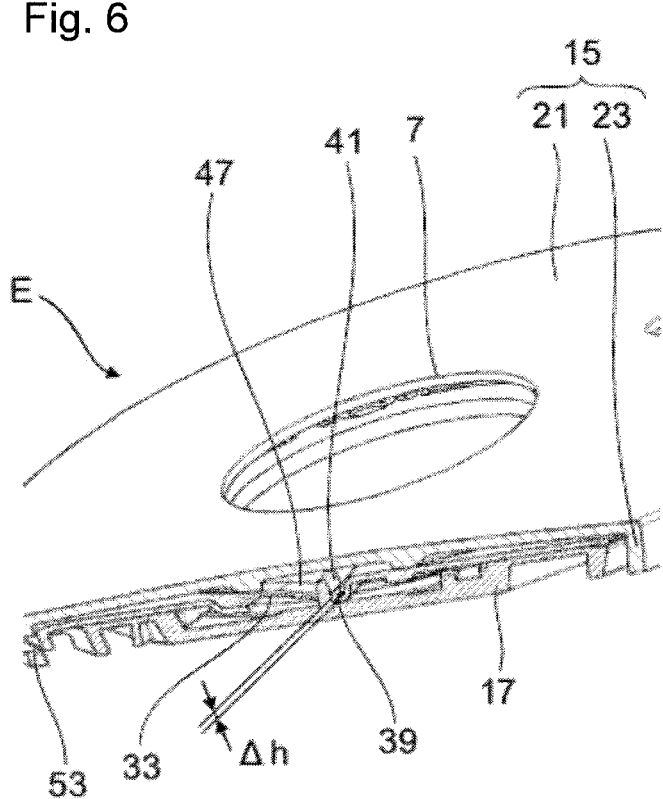
Figure 7:
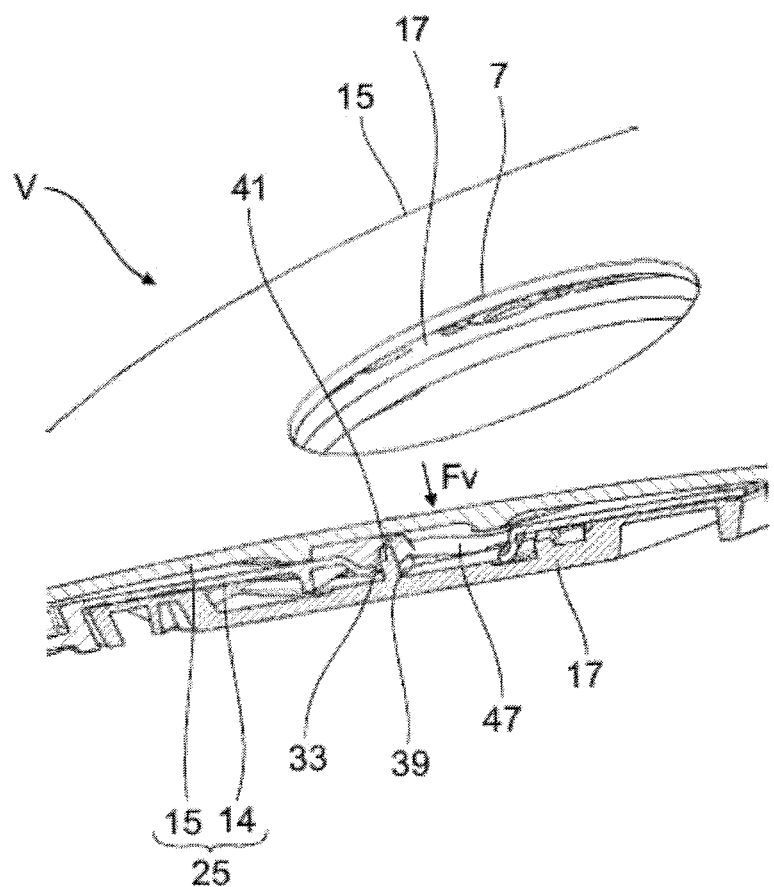
FIG. 7 is a perspective partial cross-sectional view of the rosette system, in which the bayonet ring element is shown in its locking position.

According to the invention, the preassembled unit 25 is held on the mounting part 17 (via the bayonet ring element 14) at a total of four bayonet connection points 31 (FIG. 5). The structure of one of these bayonet connection points 31 is explained below by way of example: The bayonet connection point 31 has a keyhole-like bayonet opening 33 that is designed with a portion 35 having a large cross-section and a portion 37 having a small cross-section. The bayonet opening 33 interacts with a bayonet stud 39 formed on the mounting part 17, as is shown in FIGS. 5, 6, and 7. In FIG. 5, the bayonet ring element 14 is in the release position E, in which the widened head 41 of the bayonet stud 39 is passed through the portion 35 of the bayonet opening 33 having a large cross-section. In FIG. 7, in contrast, the bayonet ring element 14 is moved into its locking position V, in which the widened head 41 of the bayonet stud 39 overlaps the edge of the portion 37 of the bayonet opening 33 having a small cross-section.

Figure 3:
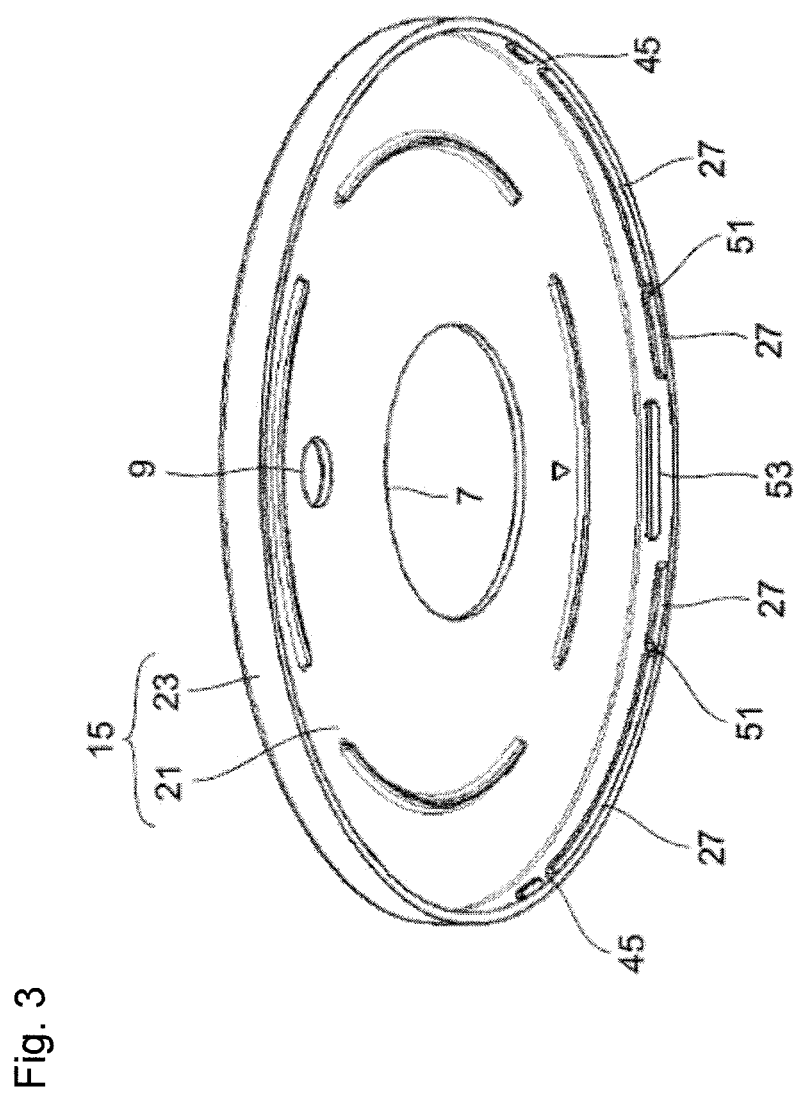
FIG. 3 is a perspective view in isolation of a trim part of a rosette system with a three-part overall design.

In contrast to the rotatably supported bayonet ring element 14, the mounting part 17 and the trim part 15 are installed in a rotationally fixed manner. For this purpose, an anti-rotation feature is provided between the trim part 15 and the mounting part 17, wherein projections 43 formed on the outer radial side of the mounting part 17 (FIG. 5) positively engage in corresponding recesses 45 (FIG. 3) in the support web 27 of the trim part 15.

Figure 4:
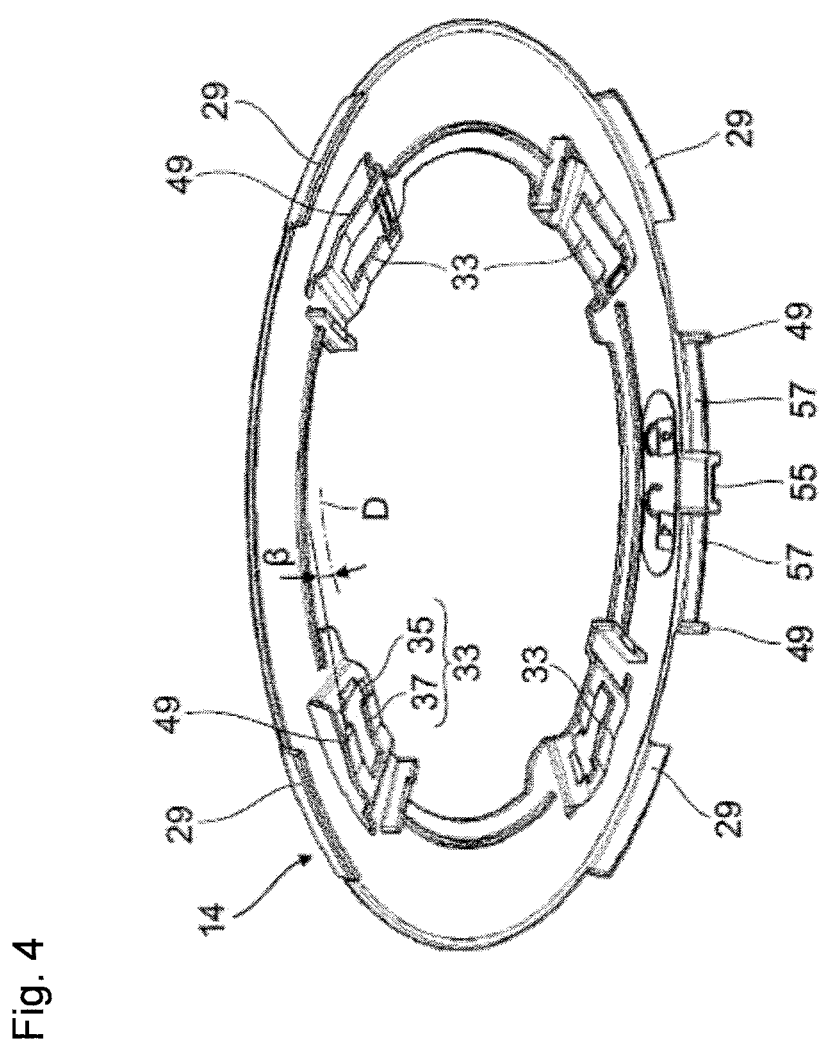
FIG. 4 is a perspective view in isolation of a bayonet ring element of the rosette system.

As is further evident from FIG. 4, each of the bayonet openings 33 is formed in a lead-in bevel 47 of the bayonet ring element 14. The lead-in bevel 47 is inclined with an angle of approach β with respect to a plane of rotation D of the bayonet ring element (FIG. 4). The angle of approach β and the circumferential length of the lead-in bevel 47 are designed such that, in the release position E (FIG. 5 or 6), the widened head 41 of the bayonet stud 39 formed on the mounting part 17 projects beyond the edge of the bayonet opening 33 by a clear height Δh (FIG. 6). During movement into the locking position V (FIG. 7), the head 41 of the bayonet stud 39 is brought into contact with the inclined edge region of the bayonet opening 33, entirely occupying this clear height Δh, namely and preferably while building up a preloading force $F_V$ (FIG. 7) by means of which the preassembled unit 25 is pulled against the mounting part 17.

As is indicated in FIG. 8, the bayonet ring element 14 is rotatable through an angular range α of approximately 13°, for example. The rotational motion of the bayonet ring element is limited by peg-like stop elements 49 (FIG. 4 or FIG. 8). The stop elements 49 are designed to be elastically resilient. When the locking or release position V, E is reached, the applicable stop element 49 snaps into a corresponding recess 51 in the support web 27 of the trim part 15, releasing an elastic restoring force.

In view of simple rotary actuation of the bayonet ring element 14, a slot-shaped tool access opening 53 is formed in the circumferential edge wall 23 of the trim part 15 (FIG. 1 or FIG. 2). The tool access opening 53 is aligned radially to the inside with a tool engagement feature 55 (for example FIG. 8) that is formed on the bayonet ring element 14.

As is evident from FIGS. 4 and 8, wall segments 57 that extend to the peg-like stop elements 49 adjoin the tool engagement feature on both sides in the circumferential direction.

The bayonet ring element 14 is made of a soft plastic material that is elastically resilient as compared to the trim part 15 and the mounting part 17. In contrast, the mounting part 17 is made of a hard plastic component (fiber-reinforced, for example).

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A sanitary fitting comprising:
a locking element; and
a rosette that covers a subassembly of the sanitary fitting and that has a trim part on a visible side and a mounting part that is covered by the trim part that is adapted to be clamped to the subassembly with an installation wall interposed,
wherein the locking element and the mounting part are in a bayonet connection in which the locking element is rotatable in a direction of actuation between a locking position, in which the trim part is installed on the mounting part, and a release position, in which the trim part is detachable from the mounting part,
wherein the locking element is a bayonet ring element that is separate from the trim part and from the mounting part,
wherein the locking element is arranged between the trim part and the mounting part such that it is concealed from view,
wherein the bayonet ring element is rotatable between the locking position and the release position, with respect to the trim part and the mounting part, while the trim part and the mounting part are rotationally fixed, such that the bayonet ring element is rotatable while the trim part and the mounting part remain stationary.

2. The sanitary fitting according to claim 1, wherein the trim part has an anti-rotation feature via which the trim part is adapted to be placed on the mounting part in a rotationally fixed manner.

3. The sanitary fitting according to claim 1, wherein the bayonet ring element has a tool engagement feature with which the bayonet ring element is moved through a manual tool action, and wherein the trim part has a tool access opening that is aligned radially to the outside with the tool engagement feature.

4. The sanitary fitting according to claim 3, wherein the bayonet ring element has stop elements that limit a rotary actuation of the bayonet ring element when the locking position or the release position is reached, and wherein the stop elements are designed to be elastically resilient and snap into a recess in the trim part when the locking position or the release position is reached.

5. The sanitary fitting according to claim 1, wherein the bayonet ring element is made of a material that is elastically resilient as compared to the trim part and the mounting part, and/or wherein the bayonet ring element and the trim part are adapted to be joined to form a preassembled unit.

6. The sanitary fitting according to claim 1, wherein the sanitary fitting is a flush-mounted sanitary fitting.

7. A sanitary fitting comprising:
a locking element; and
a rosette that covers a subassembly of the sanitary fitting and that has a trim part on a visible side and a mounting part that is covered by the trim part that is adapted to be clamped to the subassembly with an installation wall interposed,
wherein the locking element and the mounting part are in a bayonet connection in which the locking element is rotatable in a direction of actuation between a locking position, in which the trim part is installed on the mounting part, and a release position, in which the trim part is detachable from the mounting part,
wherein the locking element is a bayonet ring element that is separate from the trim part and from the mounting part,
wherein the locking element is arranged between the trim part and the mounting part such that it is concealed from view, and
wherein the bayonet ring element and the mounting part are halves of the bayonet connection, of which the bayonet ring element has at least one keyhole-like bayonet opening through which a bayonet stud of the mounting part is passed, and wherein, in the release position a widened head of the bayonet stud is passed through a portion of the bayonet opening having a large cross-section, and wherein, in the locking position, the widened head of the bayonet stud overlaps an edge of a portion of the bayonet opening having a smaller cross-section.

8. The sanitary fitting according to claim 7, wherein the trim part is free of connections with respect to the mounting part and is retained on the mounting part with the bayonet ring element arranged therebetween, and wherein the bayonet ring element is rotatably supported on the trim part.

9. The sanitary fitting according to claim 8, wherein the trim part is dish-shaped with a base and a continuous circular edge wall that is raised therefrom, and wherein the continuous edge wall forms a rotatable support for the bayonet ring element and has at least one radially inward-projecting support web that surrounds a mating contour formed circumferentially on the bayonet ring element.

10. The sanitary fitting according to claim 7, wherein the bayonet opening is formed in a lead-in bevel of the bayonet ring element that is inclined with an angle of approach with respect to a plane of rotation of the bayonet ring element such that in the release position, the widened head of the bayonet stud formed on the mounting part projects beyond an edge of the bayonet opening by a clear height, and wherein the widened head of the bayonet stud comes into contact with an edge region of the bayonet opening entirely occupying the clear height during movement into the locking position while building up a preloading force via which the bayonet ring element is pulled against the mounting part.

* * * * *